United States Patent

[11] 3,574,510

[72] Inventor Patricio Herman
 1954 Tacoma St., Cuyahoga Falls, Ohio 44221
[21] Appl. No. 804,415
[22] Filed Mar. 5, 1969
[45] Patented Apr. 13, 1971

[54] CONCEALED MEANS FOR JOINING ABUTTING ELEMENTS
 5 Claims, 5 Drawing Figs.
[52] U.S. Cl. .................................................. 287/20.924,
 52/665, 108/158, 29/526
[51] Int. Cl. .................................................. F16b 12/10
[50] Field of Search .................................. 287/20.92,
 20.92 (A), 20.92 (C), 20.92 (D), 20.92 (G), 20.92
 (E), 20.92 (W cursory), 127, 20; 312/263;
 108/152, 158, 159, 161; 29/526; 52/302, 303
 (Cursory), 665, 713; 144/313, 313.1, 314, 318

[56] References Cited
 UNITED STATES PATENTS
 3,312,139 4/1967 Cristina .................... 287/20.92EX
 FOREIGN PATENTS
 13,765 1889 Great Britain .............. 287/20.92F
 901,416 11/1944 France ....................... 287/20.92D
 136,345 7/1952 Sweden ...................... 287/20.92
 365,506 12/1962 Switzerland ................ 287/20.92D

*Primary Examiner*—David J. Williamowsky
*Assistant Examiner*—Wayne L. Shedd
*Attorney*—Hamilton, Cook, Renner & Kenner ABSTRACT: A concealed means for joining two abutting elements. The first element has at least an engaging surface and an access surface oriented angularly with respect to the engaging surface. An anchor means is secured within the engaging surface such that the axis thereof extends outwardly from the engaging surface. The second element also has an engaging surface that can be abutted to the engaging surface of the first element. The first element has an ingressive passage that opens through its access surface and communicates with the anchor means. The ingressive passage is oriented obliquely to the axis of the anchor means, and the actual fastening of the first and second elements is achieved by a screw means that extends through the anchor means of the first element and penetrates the engaging surface of the second element. Tightening and loosening the screw means is accomplished by driving means having a flexible shaft for negotiating the oblique intersection of the ingressive passage with the axis of the anchor means and for permitting actuation of the screw means by rotation of the shaft from exteriorly of the first element.

PATENTED APR 13 1971  3,574,510

INVENTOR.
PATRICIO HERMAN
BY Hamilton, Cook,
Renner & Kenner
ATTORNEYS

CONCEALED MEANS FOR JOINING ABUTTING ELEMENTS

BACKGROUND OF THE INVENTION

The present invention relates generally to concealed means for joining two abutting elements. Specifically, the present invention relates to a means and method for abuttingly joining two elements, such as pieces of wood, without exposing any part of the joinder means.

A variety of joinder means have been used for connecting two abutting pieces of wood, as, for example, nails, screws, bolts and the like. Such joinder means are, if accessible, generally exposed and thereby create an unattractive appearance, particularly when used with items of furniture or cabinetry.

Moreover, when such joinder means project outwardly from the pieces joined, particularly when loosened, they tend to abrade the hands, catch on clothing, etc. Attempts have been made to permit access for such joinder means in locations normally hidden from view, but heretofore rather large cavities have been required in at least one of the elements being joined to accommodate the joinder means. Such cavities not only tend unduly to weaken the member in which they are recessed, but they can only be positioned where visually hidden from view inasmuch as they are not readily obscured with plugs.

The use of glue does, of course, provide a completely hidden joinder means, but heretofore it has been virtually impossible to disassemble, at will, elements joined with glue.

SUMMARY OF THE INVENTION

It is, therefore, a primary object of the present invention to provide a completely concealed joinder means for abuttingly fastening two elements.

It is another object of the present invention to provide a concealed joinder means, as above, which means is strong, readily accessible, quickly assembled or disassembled, and inexpensive.

A further object of the present invention is to provide an improved method for joining two elements together in abutment without any part of the joinder means being exposed.

These and other objects which will become apparent from the following specification are accomplished by the improved constructions and methods hereinafter described and claimed.

A concealed joinder means embodying the concept of the present invention may be employed to fasten two abutting elements. The first of the elements has an engaging surface and an access surface oriented angularly with respect to the engaging surface. An anchor means is retained within the engaging surface of the first element and a screw means pierces the anchor means to extend outwardly of the engaging surface.

An ingressive passage opens through the access surface and communicates with the anchor means to admit contact with the screw means by a driving means. Because the ingressive passage is oriented obliquely with respect to the anchor means, the driving means must flex to accommodate the dogleg intersection between the anchor means and the ingressive passage.

By interfitting the driving means with the screw means and rotating the former in one direction, the screw means may be tightened into the engaging surface of the second element until the two elements are abuttingly joined. The ingressive passage, after removal of the driving means, may be readily plugged for obscuration.

Retrorotation of the driving means will permit facile dismantling of the joint.

One preferred embodiment is shown by way of example in the accompanying drawings and described in detail without attempting to show all of the various forms and modifications in which the invention might be embodied; the invention being measured by the appended claims and not by the details of the specification.

DESCRIPTION OF A PREFERRED EMBODIMENT

Figure 1:
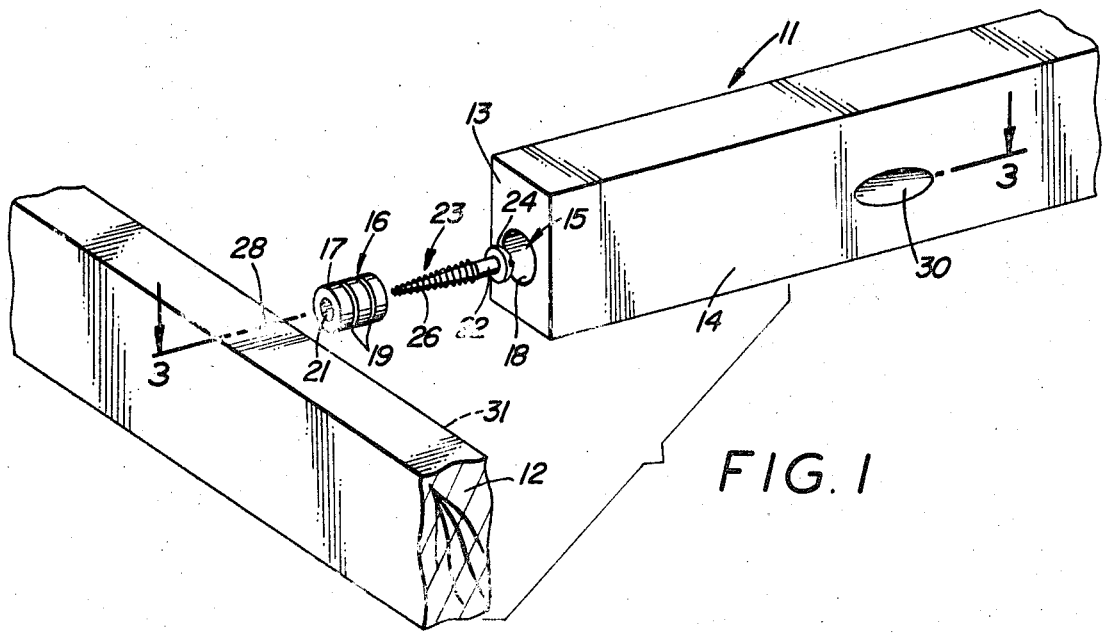
FIG. 1 is an exploded perspective showing the improved joinder means as applied to two pieces of wood to be joined in abutment at right angles to each other.

Referring more particularly to the drawings, a concealed means for abuttingly joining two elements is indicated generally by the numeral 10 and is depicted in the specific environment of joining first and second wooden members 11 and 12, respectively.

The first wooden member 11 has an engaging surface 13 and an access surface 14 angularly oriented with respect to the engaging surface. On the member 11, these two surfaces are oriented perpendicularly, but they could, as well, be at angles greater or lesser than perpendicular.

Figure 3:
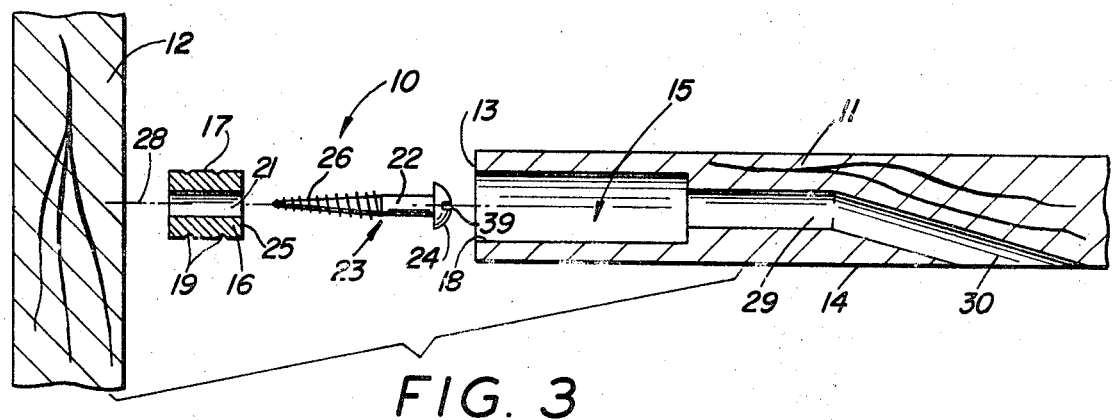
FIG. 3 is an exploded cross section, taken substantially on line 3–3 of FIG. 1.
Figure 4:
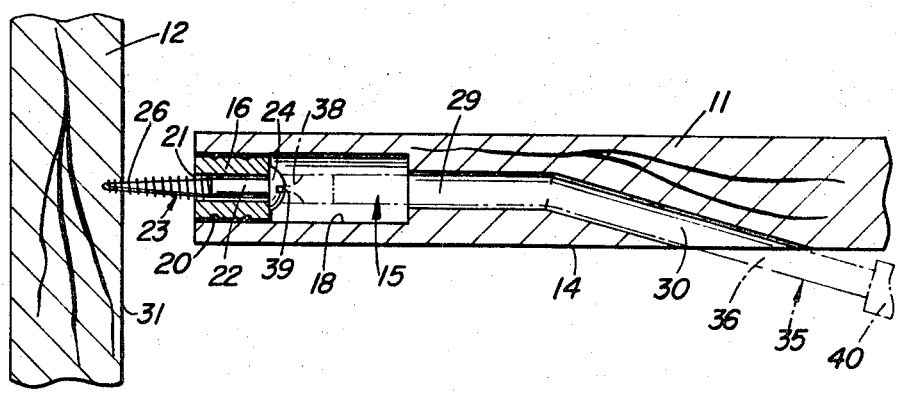
FIG. 4 is an exploded cross section, taken substantially on line 4–4 of FIG. 2 and depicting, in phantom, the driving means inserted within one wooden piece and engaging the joinder means.
Figure 5:
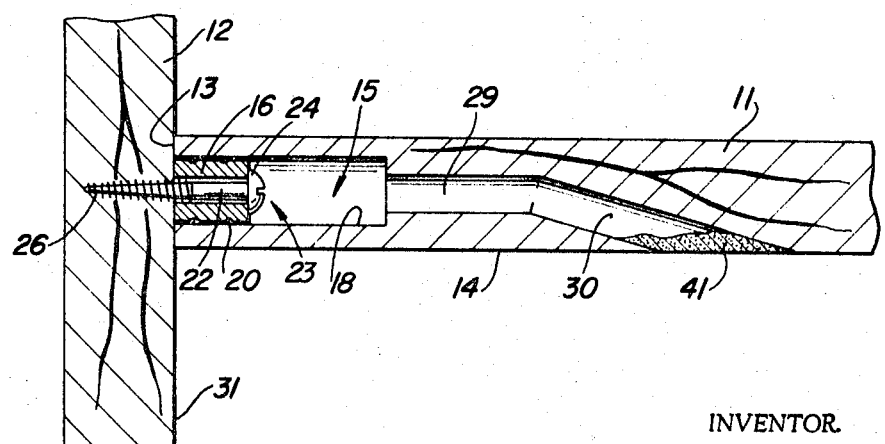
FIG. 5 is a cross-sectional view of the parts after the joinder has been completed.

An anchor cavity 15 is recessed into the engaging surface 13 of the first wooden member 11 to receive an anchor means in the form of a dowel 16. The dowel 16 is secured within the anchor cavity 15 by a suitable fastening means. As shown, the annular outer surface 17 of the dowel 16 may be glued to the cylindrical surface 18 of the cavity 15. To facilitate a glued joinder, a helical groove 19 (FIGS. 1 and 3) may be provided within the annular outer surface 18 to provide a reservoir of glue 20 (FIGS. 4 and 5).

An axial starting aperture 21 pierces the anchor dowel 16 to receive the shank 22 of a roundhead screw 23 with the head 24 abutting the axially inner face 25 of dowel 16 and its threaded portion 26 extending outwardly of the engaging surface 13 along the axis 28 of the anchor means. As shown, the axis 28 may well extend generally perpendicularly from the engaging surface 13 of the first member 11.

Coaxially of the screw 23, and dowel 16, a guide bore 29 extends concentrically of, and presents an extrusion to, the anchor cavity 15. The guide bore 29 intersects an ingressive passage 30 that is bored to open through the access surface 14 of the first wooden member 11. Because the engaging and access surfaces 13 and 14 are angularly oriented, the ingressive passage 30 is oriented obliquely with respect to the axis 28 of the anchor means.

Figure 2:
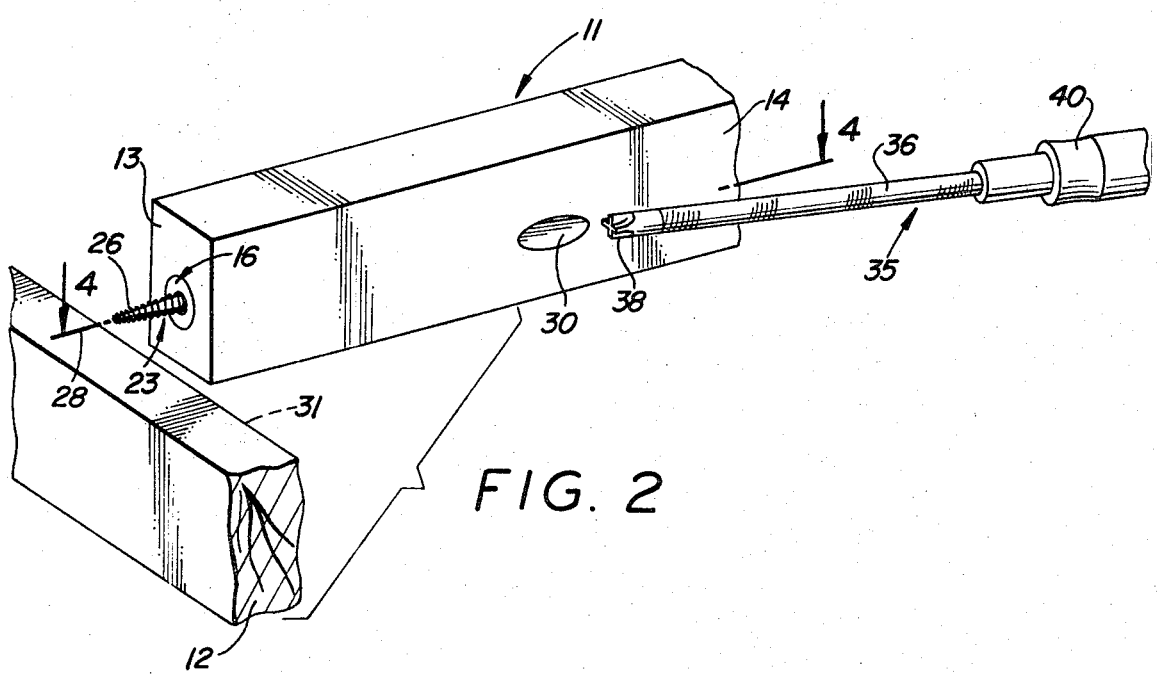
FIG. 2 is a similar view showing the anchor means secured within one of the wooden pieces and a driving means positioned to be inserted within that wooden piece for cooperative engagement with the joinder means.

In order to fasten the members 11 and 12 so that the engaging surface 13 on the first member 11 is in abutment with the engaging surface 31 on the second wooden member 12, a driving means, indicated generally by the numeral 35 (FIG. 2), having a shaft 36 which flexes to accommodate the dogleg intersection of the ingressive passage 30 and the guide bore 29 is inserted from the access surface 14, through the ingressive passage 30 and the guide bore 29 and into the anchor cavity 15 until the blade portion 38 of the driving means 35 interfits with the slot 39 on the screw head 24. Because it has been found that a Phillips screw is slightly advantageous for facilitating the blind interfitting of the blade portion 38 to the screw 23, the blade portion 38 adapted therefor is shown. However, it must be appreciated that the present concept is not so limited. So engaged, the driving means 35 is rotated to drive the screw into the engaging surface 31 of the second wooden member 12.

The two members 11 and 12 may be initially separated, as shown in FIG. 4, so that the craftsman can select the exact location at which the threaded portion 26 of screw 23 penetrates engaging surface 31, or the two members 11, 12 may first be juxtaposed. Particularly in the event that the latter procedure is followed, it is preferable that the axial extent of the anchor cavity 15 be sufficient to accommodate the full length of screw 23.

For convenience, the guide bore 29 should be of sufficient length that by contact of the flexible shaft 36 therewith the blade portion 38 will be directed against the head 24. Once the blade portion 38 contacts head 24, the drive member 35 may be rotated to align the blade portion 38 with the slot 39 in head 24.

Satisfactory flexure can be provided in shaft 36 by forming it of wire coiled in a tight helix, or, better, with two, concentric helical coils of wire, the coils being of opposite hand and both secured, at their opposite ends, to the blade portion 38 and the handle 40. By using two such oppositely wound coils the screw 23 may be tightened or loosened with equal facility.

After the screw 23 has been tightened, the drive means 35 may be removed and the entrance to the ingressive passage 30 obscurated by a plug 41 (FIG. 5). In most situations, however, the ingressive passage 30 may be oriented to open through an access surface that is normally unexposed so that no plugging would be required. But even when plugging is required, it can be done tastefully and discreetly to assure that the joinder means 10 is completely concealed.

In summary, then, the process of joining two abutting elements according to the concept of the present invention comprises the following steps. An anchor cavity 15 is recessed into an engaging surface 13 of a first element 11. An anchor means 16 is oriented within the anchor cavity 15 so that a screw 23 supported within the anchor means 16 extends outwardly of the engaging surface 13. It is often preferable that a starting aperture 21 pierce the anchor means 16 and that a guide bore 29 provide an axial extension of, and be concentric with, the anchor cavity 15. An ingressive passage 30 is bored through an access surface 14 of the first element 11, obliquely to intersect the anchor cavity 15, or its extension, the guide bore 29. After inserting a driving means 35 through said ingressive passage 30 and into interfitting contact with the screw 23, the driving means 35 is rotated to tighten or loosen the screw 23 into an engaging surface 31 of a second element 12 abutted to the first element 11. After withdrawal of the driving means 35, the ingressive passage 30 may, if not otherwise hidden, be obscurated by insertion of a plug 41.

It should thus be apparent that a joinder means embodying the concept of the present invention can be used to join two elements, remain completely concealed and otherwise accomplish the objects thereof.

I claim:

1. Concealed means for joining two abutting elements, the first said element having an engaging surface and an access surface oriented angularly with respect thereto, the second element having an engaging surface for abutting the engaging surface of said first element, said concealed joining means comprising, an anchor cavity concealed from said access surface and opening through the engaging surface of said first member, anchor means secured within said anchor cavity, screw means extending through said anchor means for penetration of the engaging surface on said second element, a guide bore also concealed from said access surface and forming an extension of said anchor cavity that extends inwardly of said first member with respect to the engaging surface thereof, said first element having an ingressive passage in the form of a straight bore presenting opposed ends, one end opening through the access surface, said ingressive passage oriented obliquely with respect to, and with the opposite end opening into, said guide bore to permit insertion of a flexible driving means through said ingressive passage and guide bore to operate the screw means.

2. A concealed means for joining two abutting elements as set forth in claim 1, in which the axis of said anchor means extends generally perpendicularly from the engaging surface of the first element.

3. A concealed means for joining two abutting elements, as set forth in claim 1, in which the anchor means comprises, a dowel secured in said anchor cavity, the screw means piercing said dowel.

4. A concealed means for joining two abutting elements, as set forth in claim 4, in which a starting aperture pierces said dowel.

5. A concealed means for joining two abutting elements, as set forth in claim 4, in which a plug is received within said ingressive passage to obscurate the opening through said access surface.